(12) United States Patent
Belair et al.

(10) Patent No.: US 7,447,202 B1
(45) Date of Patent: Nov. 4, 2008

(54) METHOD AND SYSTEM FOR OPTIMIZED RELIABLE NON-MEMBER GROUP COMMUNICATION THROUGH WRITE-ONLY MEMBERSHIP

(75) Inventors: Stephen P. Belair, Santa Cruz, CA (US); Matthew F. Williams, Santa Cruz, CA (US); Shawn Morrissey, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1136 days.

(21) Appl. No.: 10/378,997

(22) Filed: Mar. 3, 2003

(51) Int. Cl.
*H04L 12/28* (2006.01)

(52) U.S. Cl. .................. 370/389; 370/260; 370/296; 370/335; 370/432; 709/210; 709/204; 709/238; 709/250

(58) Field of Classification Search .......... 370/260, 370/270, 296, 335, 338, 432; 709/201–205, 709/238, 210
See application file for complete search history.

(56) References Cited

U.S. PATENT DOCUMENTS

| | | | | |
|---|---|---|---|---|
| 5,079,767 | A * | 1/1992 | Perlman | 370/408 |
| 5,519,704 | A * | 5/1996 | Farinacci et al. | 370/402 |
| 5,696,896 | A * | 12/1997 | Badovinatz et al. | 714/4 |
| 6,154,463 | A * | 11/2000 | Aggarwal et al. | 370/408 |
| 6,335,812 | B1 * | 1/2002 | Matsubara et al. | 398/126 |
| 6,370,142 | B1 * | 4/2002 | Pitcher et al. | 370/390 |
| 6,728,777 | B1 * | 4/2004 | Lee et al. | 709/238 |
| 6,831,918 | B1 * | 12/2004 | Kavak | 370/395.52 |
| 6,959,323 | B1 * | 10/2005 | Tzeng et al. | 709/205 |
| 7,079,535 | B2 * | 7/2006 | Kim | 370/390 |
| 2003/0018715 | A1 * | 1/2003 | O'Neill | 709/204 |
| 2003/0145102 | A1 * | 7/2003 | Keller-Tuberg | 709/237 |
| 2004/0057449 | A1 * | 3/2004 | Black | 370/432 |

OTHER PUBLICATIONS

Kazi Farooqui, "Group Support Platform: Middleware Support for Group-Based Distributed Applications," paper submitted to Middleware '98, IFIP International Conference on Distributed Systems Platforms and Open Distributed Processing, Sep. 15-18, 1998, The Lake District, England, pp. 1-18.

(Continued)

*Primary Examiner*—Edan Orgad
*Assistant Examiner*—Andrew C Lee
(74) *Attorney, Agent, or Firm*—Hickman Palermo Truong & Becker LLP

(57) ABSTRACT

A group communication mechanism for optimized reliable non-member group communication through write-only membership is disclosed. The group communication mechanism comprises two or more group member processes that receive all messages that are sent to a group. The group communication mechanism further comprises a non-group member process that has a "write-only" group membership status and does not receive any messages that are sent to the group. The non-group member process is configured to send (a) one or more messages to the group, and (b) in connection with each message that it sends to the group, a different sequence value. Each sequence value identifies an order of a message relative to other messages that the non-group member process sends to the group.

30 Claims, 5 Drawing Sheets

OTHER PUBLICATIONS

Y. Amir, et al., "Group Communications as an Infrastructure for Distributed System Management," undated, 8 pages.

Information Sciences Institute, "Transmission Control Protocol, DARPA Internet Program, Protocol Specification," Sep. 1981, http://www.ietf.org/rfc/rfc793.txt?number=793, printed Jun. 4, 2003, pp. 1-88.

S. Deering, "Host Extensions for IP Multicasting," Network Working Group, Request for Comments: 1112, Aug. 1989, http://www.ietf.org/rfc/rfc1112.txt?number=1112, printed Jun. 4, 2003, pp. 1-16.

S. Armstrong, et al., "Multicast Transport Protocol," Network Working Group, Request for Comments: 1301, Feb. 1992, http://www.ietf.org/rfc/rfc1301.txt?number=1301, printed Jun. 4, 2003, pp. 1-36.

W. Fenner, "Internet Group Management Protocol, Version 2," Network Working Group, Request for Comments: 2236, Nov. 1997, http://www.ietf.org/rfc/rfc2236.txt?number=2236, printed Jun. 4, 2003, pp. 1-23.

D. Estrin, et al., "Protocol Independent Multicast-Sparse Mode (PIM-SM): Protocol Specification," Network Working Group, Request for Comments: 2362, Jun. 1998, http://www.ietf.org/rfc/rfc2362.txt?number=2362, printed Jun. 4, 2003, pp. 1-62.

* cited by examiner

METHOD AND SYSTEM FOR OPTIMIZED RELIABLE NON-MEMBER GROUP COMMUNICATION THROUGH WRITE-ONLY MEMBERSHIP

CROSS-REFERENCE TO RELATED APPLICATIONS

This application is related to application Ser. No. 10/279,457, filed Oct. 23, 2002, the entire contents of which is hereby incorporated by reference as if fully set forth herein.

FIELD OF THE INVENTION

The present invention generally relates to inter-process communication in computer systems. The invention relates more specifically to a method and system for optimized reliable non-member group communication through write-only membership.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain computing systems comprise a distributed plurality of nodes. For example, a distributed system may comprise a distributed plurality of processors, wherein each processor is a node within the distributed system.

The several nodes of a distributed system may execute processes that communicate with each other to achieve some result. For example, a first node may execute a first process that communicates with a second process that is executed by a second node. A given node of a distributed system may execute multiple processes. Communication between processes that execute within a distributed system is typically achieved through messages that are sent between those processes. A message typically indicates an address for which the message is destined.

Within a distributed system, processes that execute on different nodes may have a collective identity. Such processes may share a role in the distributed system collectively. Such processes may form a group, assuming that the distributed system provides for group communication. Multiple groups may exist within a distributed system, and nodes within the distributed system may be associated with multiple groups. Two or more nodes within a distributed system may be associated with the same group. A membership service implemented within a distributed system may maintain information about which nodes are associated with a particular group. A process that executes on a node that is associated with a particular group may be called a "group member process" of the particular group. A process that executes on a node that is not associated with the particular group may be called a "non-group member process" relative to the particular group. Each group has a different group address. Typically, a message that is delivered to a particular group's group address reaches all of the particular group's group member processes and only the particular group's group member processes.

By sending a message to a single group instead of multiple nodes, a message sender does not need to possess information about the location or identity of any of the individual message receivers. In other words, by sending a message to a group, a message sender can be referentially decoupled from all of the individual message receivers. For example, a group member process may send a message to a group by instructing a transport layer, through a primitive provided by an application programming interface (API), to send the message to the group's group address. Under some approaches, a transport layer sends the message by multicasting the message. Thus, according to some approaches, a group address is sometimes called a "multicast address." Under other approaches, a transport layer emulates multicasting the message but actually sends the message through means other than multicasting the message. In response to such an instruction from a group member process, and in conjunction with a membership layer, the transport layer makes a reasonable best effort attempt to deliver the message to all of the group's group member processes.

Communication between processes that execute in a distributed system is not problem-free. Due to the imperfect nature of computing systems generally, the mere sending of a message does not guarantee that the message actually will be received by any of the intended receivers. For example, a failure of a system component can cause messages to become, or appear to become, lost in transit.

Additionally, in asychrononous distributed systems, even though messages originally may be sent in a certain intended order, the messages ultimately may be received in a different order. For example, if a message sender retransmits a message, then the retransmitted message may be received out of order relative to other messages that were not retransmitted. Sometimes, message order is important. For example, if messages that represent consecutive segments of a video stream are received out of order, then it is unsatisfactory to present the segments to a user in the same order in which the messages were received.

One approach to guarantee that messages communicated between group member processes are communicated reliably and with sufficient information to enable a recipient to organize the messages into an intended order involves associating each group member process with its own "sequence number space." The concept of a sequence number space is a part of group communication. When a process joins a group, all of the group members agree on the new group member process and the new group member process' sequence number space. Each message that a group member process sends is associated with a different sequence number that uniquely identifies the message and the message's intended order relative to other messages that the group member process sends. When any group member process receives a message from another group member process, the receiving group member process determines whether the message's associated sequence number matches a sequence number that is next expected from the sending group member process. Each group member process maintains a separate next expected sequence number for each other group member process. Thus, each group member process is associated with its own separate and group-recognized sequence number space.

If the message's associated sequence number matches the next expected sequence number, then the receiving group member process increments the next expected sequence number and sends an acknowledgement to the sending group member process. Because the acknowledgement identifies the message's associated sequence number, the sending group member process "knows" upon receiving the acknowledgment that the message does not need to be retransmitted. According to one approach, a transport layer keeps track of how many acknowledgements are expected as a result of sending a message to a group that has a certain number of members.

Alternatively, if the message's associated sequence number does not match the next expected sequence number, then the receiving group member process does not send an acknowledgement to the sending group member process. According to one approach, the sending group member process recognizes, due to the lack of an acknowledgement that corresponds to the message's sequence number, that the message needs to be retransmitted. Under another approach, the receiving group member process requests that the sending group member process retransmit the message that is associated with the next expected sequence number. According to one approach, the transport layer retransmits the message while awaiting the expected number of acknowledgements. The transport layer counts acknowledgements to determine whether a message has been delivered reliably. After a specified period of time has passed, the transport layer may determine that delivery has failed.

The approaches described above guarantee reliable and orderly communication between group member processes, at least in part through the acknowledgement and retransmission of messages. In other words, the approaches described above guarantee reliable group communication. However, it is sometimes beneficial to associate only some, and not all, nodes of a distributed system with a particular group.

Under some circumstances, it is useful for a non-group member process to send a message to a group. For example, a non-group member process may be a client application that requests a service that is collectively offered by group member server processes that execute on nodes that are associated with the group. For another example, a non-group member process may publish data to group member processes that collectively expect the data, wherein all of the group member processes execute on nodes that are associated with the group.

Due to past definitions of group membership, in past approaches, only group member processes have been associated with group-recognized sequence number spaces. As a result, the mechanisms described above that ensure reliable and orderly communication between group member processes have not been available to guarantee reliable and orderly communication between a non-group member process and a plurality of group member processes.

Thus, when a non-group member process sends a message to a group, the intended receivers are unable to acknowledge the message according to a sequence number, because, by definition, the intended receivers do not maintain a sequence number space in connection with a non-group member process. In the absence of acknowledgements, the non-group member process may attempt to increase the probability that the message will be received by all of the group member processes by retransmitting the message to the group.

While this approach may increase the probability that the message will be received by all of the group member processes, it also introduces the possibility that one or more group member processes may receive the same message twice. In the absence of a unique sequence number per message, the group member processes are not able to ascertain if a given message duplicates a message that has already been received. Two messages with the same content may or may not be duplicates. Sometimes, it is important to be able to determine whether a message is a duplicate of a prior message. For example, if a message that represents an unrepeated segment of a video stream is received more than once, then it is unsatisfactory to present that segment to a user more than once.

Existing distributed systems cannot guarantee that every group member process that executes on a node that is associated with a group will receive, in the intended order, all messages that a non-group member process sends to the group, especially when those messages are delivered at high rates. Because existing approaches do not provide a sequence number space for non-group member processes, existing approaches do not impose any order on messages that are sent to a group by a non-group member process.

Based on the foregoing, there is a clear need for a way to communicate messages from a non-group member process to a group in an optimal, reliable, and orderly manner, without causing the non-group member process to receive messages that are sent to the group.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
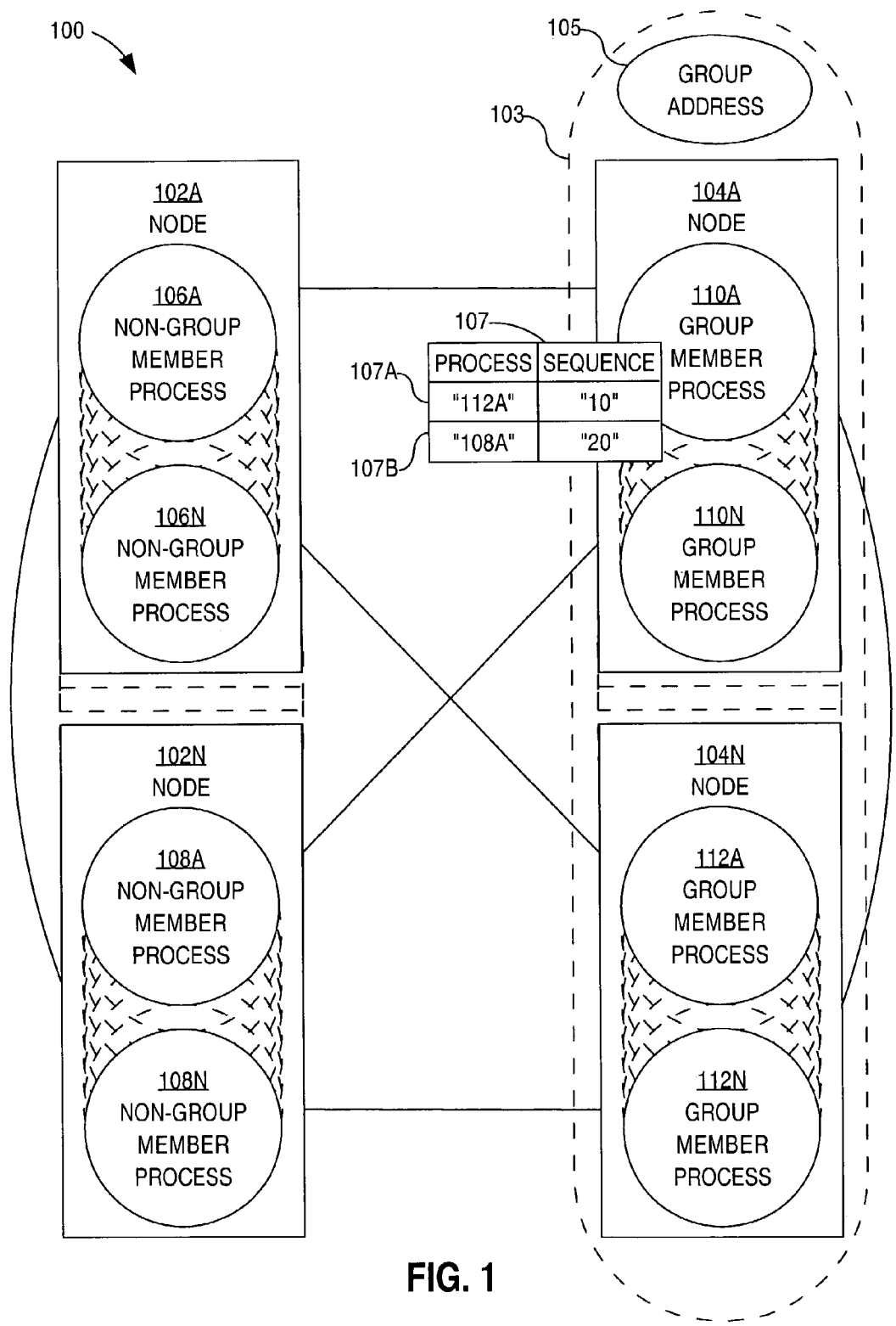
FIG. 1 is a block diagram that illustrates an overview of a distributed system that may be used to optimally and reliably communicate messages from a non-group member process to a group.

A method and system for optimized reliable non-member group communication through write-only membership is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Optimally and Reliably Communicating Messages From a Non-Group Member Process to a Group
4.0 Implementation Mechanisms-Hardware Overview
5.0 Extensions and Alternatives 1.0 GENERAL OVERVIEW The needs identified in the foregoing Background, and other needs and objects that will become apparent for the following description, are achieved in the present invention, which comprises, in one aspect, a group communication mechanism for optimized reliable non-member group communication through write-only membership, or, in other words, a group communication mechanism for reliably and efficiently communicating messages from a non-group member process to a group. The group communication mechanism comprises two or more group member processes that are members of a group. By virtue of their group membership, each group member process receives all messages that are sent to a group. The group communication mechanism provides a primitive that a process may invoke to join a group. When a process invokes the primitive, a membership layer of the group communication mechanism adds the process to the group address and informs current members of the group about the new group member process and the new group member process' sequence number space.

The group communication mechanism further comprises at least one non-group member process. Non-group member processes do not receive any messages that are sent to the group. At least one of the non-group member processes is configured to send one or more messages to the group. At least one such non-group member process is also configured to send, in connection with each message that it sends to the group, a different sequence value. Each sequence value identifies an order of a message relative to other messages that the non-group member process sends to the group. The group communication mechanism provides a special primitive that a non-group member process may invoke. When a non-group member process invokes the special primitive, a membership layer of the group communication mechanism informs current members of the group about the non-group member process and the non-group member process' sequence number space, but does not add the non-group member process to the group address. Thus, in addition to a primitive that allows a process to join a group as a group member process with both read and write privileges, the group communication mechanism provides a special primitive that endows a process with write-only privileges.

Thus, a new kind of group membership status is described. In certain embodiments, the new status is termed "write-only group membership." A process having that status is associated with its own separate group-recognized sequence number space as though it was a group member process. However, as a non-group member process, a process having that status does not receive any messages that are sent to the group. In other words, a non-group member process that executes within a distributed system may send messages to a group as efficiently and with the same semantics as any group member process, while still retaining the semantics of non-membership, in that the non-group member process does not receive any control or data messages sent to the group.

Thus, within the distributed system, messages can be sent from non-group member processes to a group in a reliable and orderly manner, without causing the non-group member processes to receive messages that are sent to the group. As a result, fewer total messages are communicated between processes that execute within the distributed system. Reliable and orderly inter-process communication is provided without sacrificing distributed system performance.

In another aspect, the invention encompasses methods that may be performed by mechanisms such as those that comprise the foregoing distributed system, and a computer-readable medium that bears instructions that are designed to cause one or more processors to carry out the steps of one or more of such methods.

2.0 STRUCTURAL AND FUNCTIONAL OVERVIEW

FIG. 1 is a block diagram that illustrates an overview of a distributed system that may be used to optimally and reliably communicate messages from a non-group member process to a group. A distributed system 100 comprises nodes 102A-102N and nodes 104A-104N. Nodes 102A-102N and nodes 104A-104N are each communicatively coupled with each other. For example, nodes 102A-102N may be line cards in a distributed router, and nodes 104A-104N may be route processors in a distributed router.

Nodes 104A-104N are in a group 103 that has a group address 105. Thus, every process that executes on any of nodes 104A-104N is configured to receive all messages that are sent to group 103. Nodes 102A-102N are not associated with group address 103. Thus, no process that executes on any of nodes 102A-102N is configured to receive any message that is sent to group 103.

While nodes 102A-102N are not associated with the same group 103 with which nodes 104A-104N are associated, it should not be implied that nodes 102A-102N are not associated with any group. While nodes 104A-104N are associated with group 103, it should not be implied that nodes 104A-104N are associated with only one group, or that all groups with which one or more of nodes 104A-104N are associated are groups with which all others of nodes 104A-104N are associated. While distributed system 100 is described herein with reference to one particular group 103, distributed systems of alternative embodiments may comprise more than one group, with a different set of nodes associated with each different group, and with some nodes associated with several different groups.

Node 102A is configured to execute non-group member processes 106A-106N. Similarly, node 102N is configured to execute non-group member processes 108A-108N. Others of nodes 102A-102N may also be configured to execute one or more non-group member processes.

Node 104A is configured to execute group member processes 110A-110N. Similarly, node 104N is configured to execute group member processes 112A-112N. Others of nodes 104A-104N may also be configured to execute one or more group member processes.

Each of non-group member processes 106A-106N and 108A-108N is configured to send one or more messages to the group with which nodes 104A-104N are associated. For example, non-group member processes 106A-106N and 108A-108N may be configured to stream or publish line card interface data to a group. In this arrangement, non-group member processes 106A-106N, 108A-108N may be termed "write-only" members of group 103.

Each of the non-group member processes is further configured to send, in connection with each message that the non-group member process sends to the group, a sequence value that identifies the order of the message relative to other messages that the non-group member sends to the group. For example, each successive sequence value sent by a particular non-group member may be an integer that is one greater than the preceding sequence value that was sent by the particular non-group member.

As processes that execute on nodes that are associated with a group, each of group member processes 110A-110N, 112A-112N is configured to receive all messages that are sent to the group. For example, group member processes 110A-110N, 112A-112N may be configured to cache line card interface data that has been sent to a group.

Each of the group member processes is further configured to receive, in connection with each message that is sent to group 103, a sequence value that indicates the message's order relative to other messages sent from a particular sender. A sequence value sent in connection with one message may differ from a sequence value sent in connection with another message. Because a separate sequence number space is associated with each message sender, it is permissible for the range of sequence values that are sent in connection with messages from one sender to overlap with the range of sequence values that are sent in connection with messages from another sender. Sequence values that are sent in connection with messages from a particular sender are not repeated in connection with other messages from the particular sender except if such messages are being retransmitted.

Each of the group member processes is configured to maintain, for each other process that executes on any of the nodes in distributed system 100—regardless of whether that other process is a group member process or a non-group member process—a separate current expected sequence value for that other process. A current expected sequence value maintained for one process might be different than a current expected sequence value that is maintained for another process. For example, group member process 110A may maintain a first current expected sequence value for group member process 112A, a second current expected sequence value for non-group member process 106A, and a third current expected sequence value for non-group member process 108A. The first, second, and third current expected sequence values may all differ from each other.

According to one embodiment, each group member process maintains a data structure for tracking the current expected sequence values for other processes. For example, group member process 110A may maintain a data structure such as table 107. Table 107 is a mapping that includes a row for each process other than the process that maintains the table. For example, table 107 includes rows 107A and 107B, among others. Row 107A indicates that process 112A is associated with current expected sequence value "10." Row 107B indicates that process 108A is associated with current expected sequence value "20." Even though process 108A is a non-group member process, table 107 stores a current expected sequence value that is associated with process 108A. According to one embodiment, the current expected sequence value that is associated with a particular process in a particular table is the same current expected sequence value that is associated with that particular process in every table that maintains a row for that process.

According to one embodiment, all group member processes agree upon a separate sequence number space for each non-group member process. For example, agreement may be achieved through messages that are sent between group member processes—and not to non-group member processes. As a result of the agreement, the current expected sequence number associated with a particular non-group member processes is the same current expected sequence number maintained by all of the group member processes for the particular non-group member process. For example, the current expected sequence number that group member process 110A maintains in association with non-group member process 106A is the same as the current expected sequence number that group member process 112A maintains in association with non-group member process 106A.

For example, each of group member processes 110A-110N and 112A-112N may maintain a current expected sequence number "10" for non-group member process 106A and a current expected sequence number "20" for non-group member process 108A.

Thus, each of group member processes 110A-110N and 112A-112N is configured to maintain, for other each process that executes on any of the nodes in distributed system 100, a separate, group-recognized sequence number space for that other process. Unlike prior approaches, in which each of the group member processes maintained sequence number spaces only for other group member processes, group member processes 110A-110N and 112A-112N are configured to maintain sequence number spaces for non-group member processes also.

Each of group member processes 11A-110N and 112A-112N is configured to determine, for each sequence value received in connection with a message received from a particular one of non-group member processes 106A-106N and 108A-108N, whether the received sequence value matches a current expected sequence value that the receiving group member process maintains for the particular one of the sending non-group member processes.

According to one embodiment, each receiving group member process is further configured to send an acknowledgement to the sending non-group member process based on the receiving group member process determining that a received sequence value matches a current expected sequence value that is associated with the sending non-group member process. The acknowledgement identifies the received sequence number. Using the acknowledgement, the sending non-group member process may identify messages that it successfully sent.

According to one embodiment, each receiving group member process is configured to increment a current expected sequence value that is associated with the sending non-group member process based on the receiving group member process determining that a received sequence value matches the current expected sequence value that is associated with the sending non-group member process. In other words, once a group member process ascertains that it has received the next expected message from a particular non-group member process, the group member process expects, from the particular non-group member process, the next message after that.

According to one embodiment, each receiving group member processes is configured to send, based on the receiving group member process determining that a received sequence value does not match a current expected sequence value that is associated with the sending non-group member process, a retransmission request to the sending non-group member process. The retransmission request identifies the current expected sequence value. Thus, the sending non-member process may identify which messages need to be retransmitted.

According to one embodiment, each of non-group member processes 106A-106N and 108A-108N is configured to receive a retransmission request that identifies a particular sequence value, and to send, in response, one or more messages that are selected, based on the particular sequence value, from among messages that the non-group member process has already sent to the group. For example, if non-group member process 106A receives a retransmission request that identifies a sequence value "50", and if non-group member process 106A last transmitted a message that was associated with a sequence value "53", then non-group member process 106 may selectively retransmit messages that are associated with sequence values from "50" through "53".

According to one embodiment, each of group member processes 110A-110N and 112A-112N is configured to sort, based on sequence values that were received in connection with messages from another process, the messages that were received from that other process, which may be a non-group member process or a group member process. Thus, a receiving group member process may place messages received from a sending non-group member process in an order intended by the sending non-group member process.

Therefore, within distributed system 100, messages can be communicated from non-group member processes 106A-106N and 108A-108N to a group in a reliable and orderly manner, without causing the non-group member processes to receive messages that are sent to the group. For example, a line card in a distributed router that is configured according to one embodiment may stream line card interface data to route processors that are associated with a group in a reliable and orderly manner without causing other line cards in the distributed router to receive the streamed data.

3.0 METHOD OF OPTIMALLY AND RELIABLY COMMUNICATING MESSAGES FROM A NON-GROUP MEMBER PROCESS TO A GROUP

Figure 2:
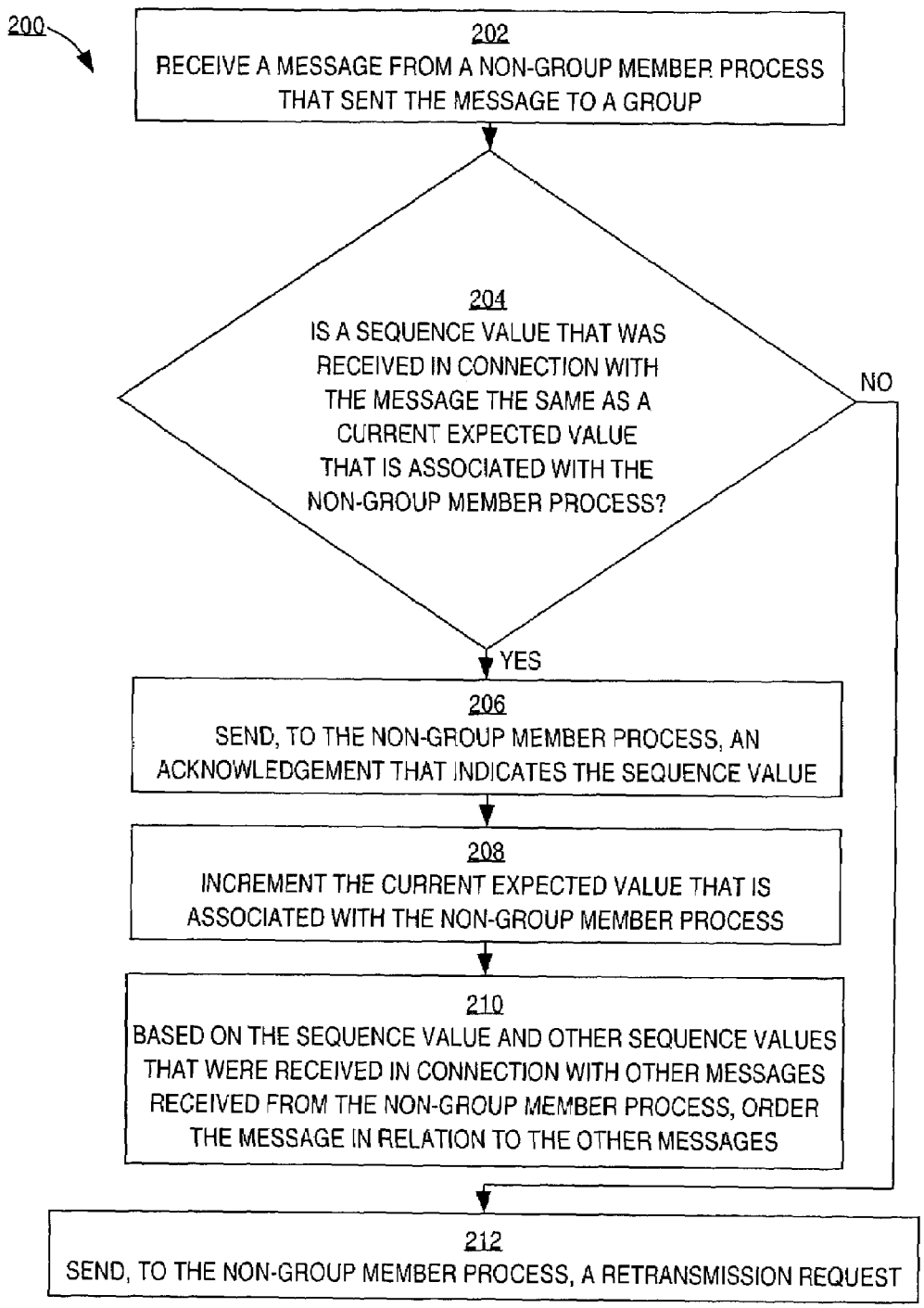
FIG. 2 is a flow diagram that illustrates a high level overview of one embodiment of a method for optimally and reliably communicating messages from a non-group member process to a group.

FIG. 2 is a flow diagram that illustrates a high level overview of one embodiment of a method 200 for optimally and reliably communicating messages from a non-group member process to a group. Such a method may be performed by any one of many different mechanisms, such as, for example, one of group member processes 110A-110N and 112A-112N described above.

In block 202, a message is received from a non-group member process that sent the message to a group. According to one embodiment, the non-group member process executes on a node that is (a) part of a distributed system and (b) not associated with the group. Messages that are sent to the group are delivered only to all nodes that are associated with the group. The message received in block 202 includes a sequence value.

In block 204, in response to receiving the message, it is determined whether a sequence value that was received with the message is the same as a current expected value that is associated with the non-group member process. According to one embodiment, the current expected value is agreed upon by a plurality of group member processes. For example, the current expected sequence value may be negotiated in advance and stored in an appropriate mapping.

If the sequence value is the same as the current expected value, then, in block 206, an acknowledgement that indicates the sequence value is sent to the non-group member process. According to one embodiment, the sequence value is contained within the acknowledgement.

In block 208, the current expected value that is associated with the non-group member process is incremented. The current expected value is incremented to reflect a next sequential value, which might or might not be a numeric value.

In block 210, based on the sequence value and other sequence values that were received in connection with other messages received from the non-group member process, the message is ordered in relation to the other messages. For example, the messages may be sorted according to sequence numbers contained with the messages.

Returning to block 204, if the sequence value is not the same as the current expected value, then, in block 212, a retransmission request is sent to the non-group member process. The current expected value is not updated. According to one embodiment, the retransmission request specifies the current value that is associated with the non-member process. According to one embodiment, receipt of the retransmission request causes the non-group member process to send one or more messages that are selected, based on the sequence value, from among messages that the non-group member process has already sent to the group.

Figure 3:
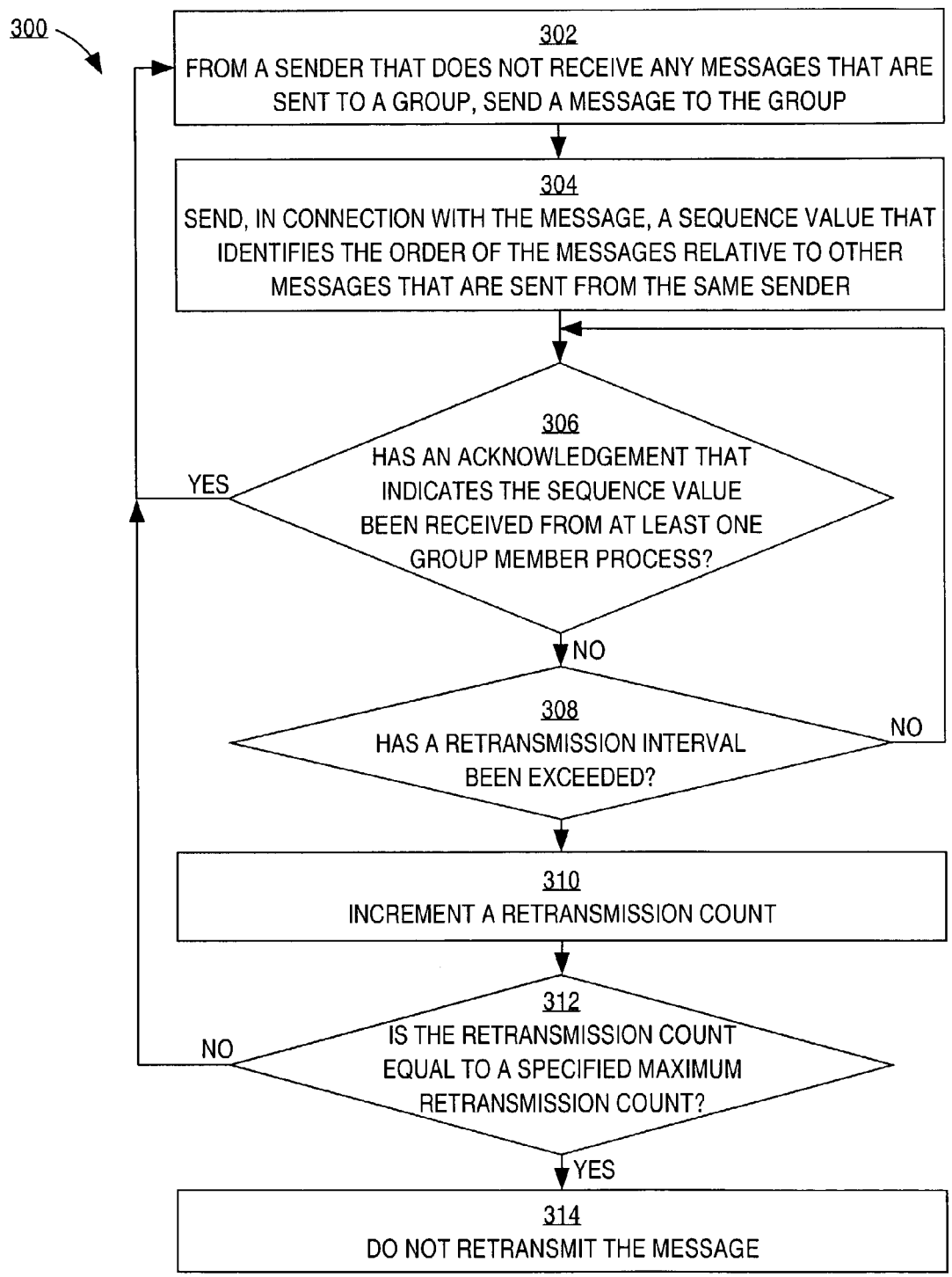
FIG. 3 is a flow diagram that illustrates one embodiment of a method for optimally and reliably communicating messages from a non-group member process to a group using acknowledgments.

FIG. 3 is a flow diagram that illustrates a high level overview of one embodiment of a method 300 for optimally and reliably communicating messages from a non-group member process to a group using acknowledgments. Method 300 may be performed by any one of many different mechanisms, such as, for example, one of non-group member processes 106A-106N and 108A-108N described above.

In block 302, a message is sent to a group. The sender of the message is a write-only member of the group. Consequently, the sender does not receive any messages that are sent to the group. Messages that are sent to the group are received by a plurality of group member processes. According to one embodiment, the plurality of group member processes execute on one or more nodes that are (a) a part of a distributed system and (b) associated with the group. According to one embodiment, every message that is sent to the group is delivered only to all nodes that are associated with the group.

In block 304, a sequence value, which identifies the order of the message relative to other messages that are sent from the same sender, is sent in connection with the message. The sequence value sequentially follows a previous sequence value that was sent in connection with another message that the sender most recently sent. According to one embodiment, the sequence value is contained within the message. Message recipients may use the sequence number to order the message relative to other messages sent by the same sender and to determine whether any of the messages sent by the same sender were not received.

In block 306, it is determined whether an acknowledgement, which indicates the sequence value, has been received from at least one group member process that executes on a node that is associated with the group.

If an acknowledgement that indicates the sequence value has been received, then control passes back to block 302, in which another message is sent. Alternatively, if an acknowledgement that indicates the sequence value has not been received, then control passes to block 308.

In block 308, it is determined whether a retransmission interval has been exceeded. For example, the retransmission interval may be a specified period of time. If the retransmission interval has not been exceeded, then control passes back to block 306. Otherwise, control passes to block 310.

In block 310, a retransmission count is incremented. In block 312, it is determined whether the retransmission count is equal to a specified maximum retransmission count. If the retransmission count is not yet equal to the specified maximum retransmission count, then control passes back to block 302, in which the message is retransmitted. The same sequence value will be sent in connection with the message in block 304. If the retransmission count is equal to the specified maximum retransmission count, then control passes to block 314.

In block 314, the message is not retransmitted. An indication that the message's transmission has failed may be generated.

Thus, in one embodiment, another message is not sent until an acknowledgement of the receipt of that message has been received. Because the sequence value distinguishes a message from other messages sent by a sender, the sender may determine, from the sequence value contained in an acknowledgment, whether the message was received.

Figure 4:
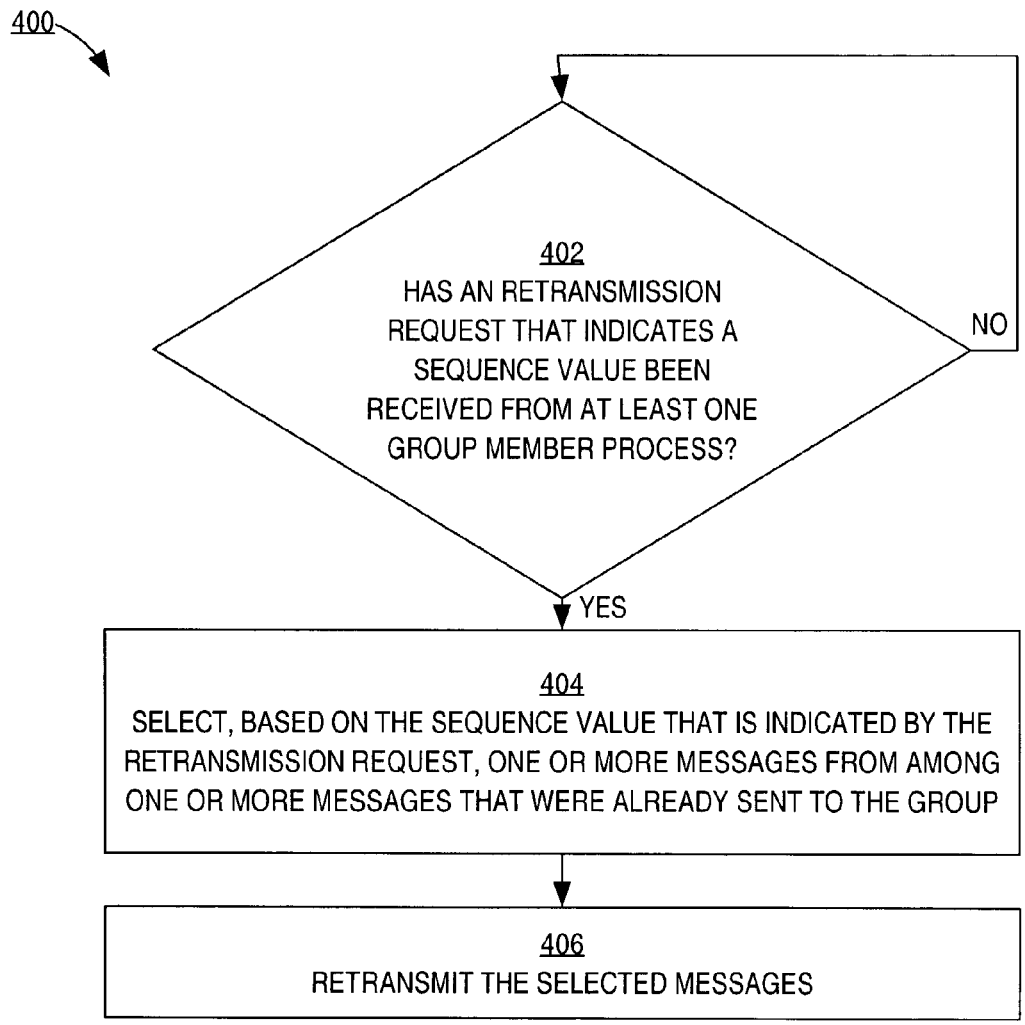
FIG. 4 is a flow diagram that illustrates one embodiment of a method for optimally and reliably communicating messages from a non-group member process to a group using retransmission requests.

FIG. 4 is a flow diagram that illustrates a high level overview of one embodiment of a method 400 for optimally and reliably communicating messages from a non-group member process to a group using retransmission requests. Method 400 may be performed by any one of many different mechanisms, such as, for example, one of non-group member processes 106A-106N and 108A-108N described above.

In block 402, it is determined whether an retransmission request, which indicates a sequence value, has been received from at least one group member process that executes on a node that is associated with a group.

If a retransmission request has not been received, then control passes back to block 402. Alternatively, if a retransmission request has been received, then, in block 404, one or more messages are selected, based on the sequence value that is indicated by the retransmission request, from among one or more messages that were already sent to the group, although not necessarily received by all of the intended recipients. For example, if the sequence value specified by the retransmission request is "50" and a message containing a sequence value "53" has already been sent, then messages containing sequence values "50" through "53" may be selected.

In block 406, the selected messages are retransmitted. For example, the selected messages may be retransmitted to the group, to a particular node that is associated with the group, or to a particular group member process that executes on a node that is associated with the group.

4.0 IMPLEMENTATION MECHANISMS

Hardware Overview

Figure 5:
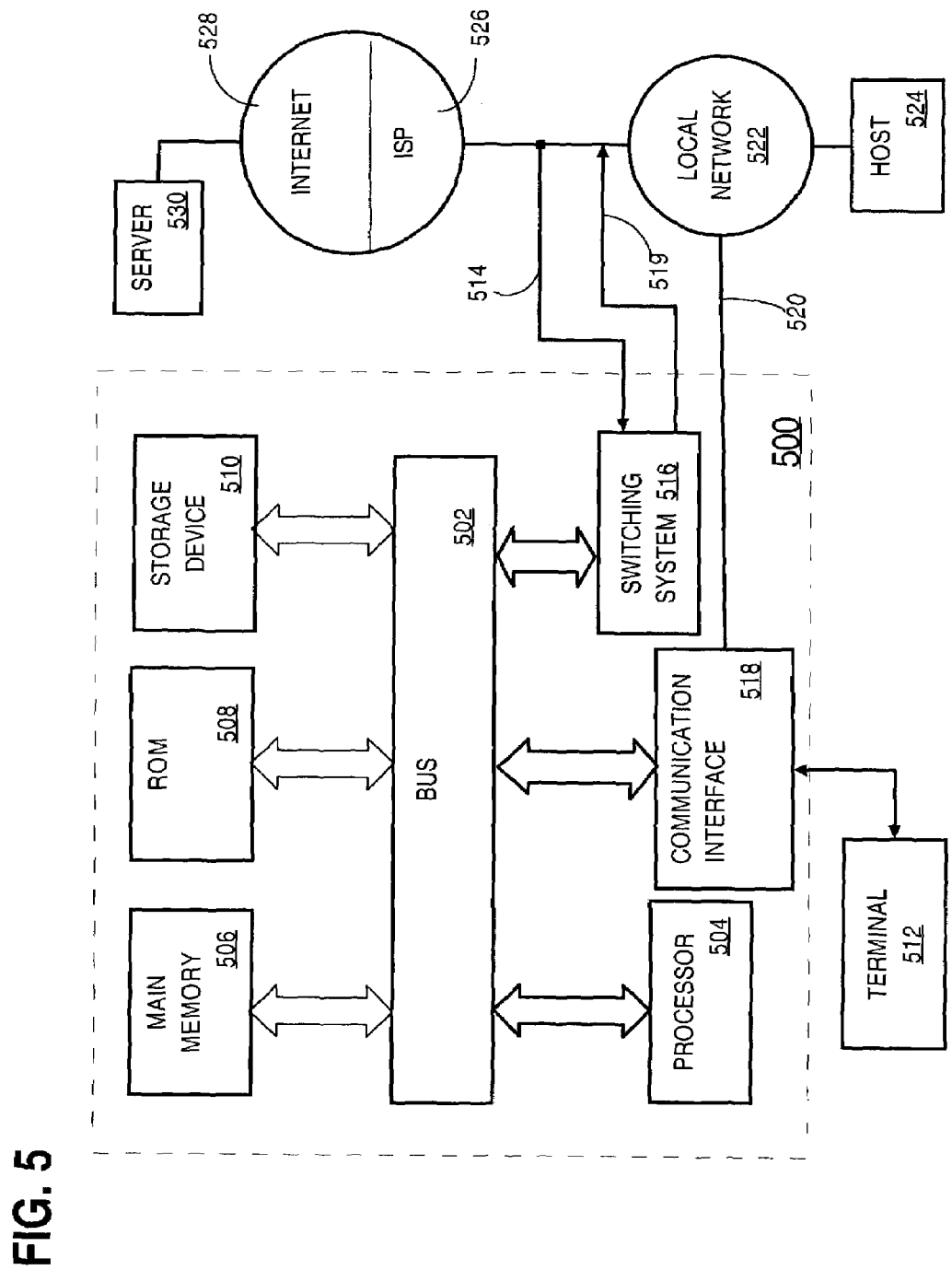
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for optimized reliable non-member group communication through write-only membership. According to one embodiment of the invention, the optimized reliable non-member group communication through write-only membership is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for optimized reliable non-member group communication through write-only membership as described herein.

Processor 504 may execute the received code as it is received, and/or stored in storage device 510, or other non-volatile storage for later execution. In this manner, computer system 500 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, instead of associating each non-group member process with its own separate group-recognized sequence number space, a proxy-based approach may be implemented to ensure that messages are reliably delivered to a group. According to the proxy-based approach, a non-group member process multicasts a message to a group. The message may be called a "proxy request." One of the group member processes is designated to be a "proxy handler." For example, the proxy handler may be a group leader process or a process appointed by all of the group members.

Under the proxy-based approach, when a non-group member process multicasts a message to the group, all of the group member processes receive the message unless some error occurs in transit. Therefore, unless some error occurs in transit, the proxy handler also receives the message. All of the group member processes except for the proxy handler disregard the message that is sent from the non-group member process.

The proxy handler assigns a group-recognized sequence number to the message and then multicasts the message, in connection with the sequence number, to the group. Unless some error occurs in transit, all of the group member processes receive the message in connection with the sequence number. The group member processes may then respond to the proxy handler with responses, such as acknowledgements or retransmission requests, that are selected based on whether the group member processes expected to receive the particular sequence number or a different sequence number. Based on the response from the group member processes, the proxy handler may retransmit the message to the group and/or send a delivery status to the non-group member process that originally sent the proxy request.

What is claimed is:

1. A method for optimized reliable non-member group communication through write-only membership, the method comprising:

receiving a message that was sent to a group from a non-group member process;

in response to receiving the message, determining whether a sequence value that was received in connection with the message matches a current value that is associated with the non-group member process; and if the sequence value matches the current value, then sending to the non-group member process an acknowledgement that indicates the sequence value;

wherein the non-group member process does not receive messages that are sent to the group.

2. The method of claim 1, further comprising:

if the sequence value is not the same as the current value, then sending a retransmission request to the non-group member process.

3. The method of claim 1, further comprising:

based on sequence values that were received in connection with messages that were received from the non-group member process, sorting the messages that were received from the non-group member process.

4. The method of claim 1, further comprising:

if the sequence value is the same as the current value, then incrementing the current value.

5. The method of claim 1, wherein:

the non-group member process executes on a node that is (a) a part of a distributed system and (b) not associated with the group; and every message that is sent to the group is delivered only to all nodes that are associated with the group.

6. The method of claim 1, further comprising:

if the sequence value is not the same as the current value, then sending to the non-group member process a retransmission request (a) that identifies the sequence value, and (b) whose receipt causes the non-group member process to send one or more messages that are selected, based on the sequence value, from among messages that the non-group member process has already sent to the group.

7. A method for optimized reliable non-member group communication through write-only membership, the method comprising:

sending one or more messages to a group;

wherein said sending is by a sender that is not a member of the group; and sending, in connection with each such message, a sequence value that identifies the order of each such message relative to others of the one or more messages;

wherein the sequence value is incremented after receiving, by the sender, an acknowledgment, from the group, that indicates the sequence value;

wherein the one or more messages that are sent to the group are received by a plurality of group member processes; and wherein the sender of the one or more messages does not receive the one or more messages.

8. The method of claim 7, further comprising:
receiving, from at least one of the group member processes, an acknowledgement that indicates a sequence value that was sent in connection with one of the one or more messages.

9. The method of claim 7, further comprising:
receiving, from at least one of the group member processes, a retransmission request that indicates a sequence value that was sent in connection with one of the one or more messages.

10. The method of claim 7, wherein the sequence value is used by one or more of the group member processes to sort the one or more messages.

11. The method of claim 7, wherein the sequence value is used by one or more of the group member processes to determine whether any of the one or more messages was not received.

12. The method of claim 7, wherein:
the plurality of group member processes execute on one or more nodes that are (a) a part of a distributed system and (b) associated with the group; and
every message that is sent to the group is delivered only to all nodes that are associated with the group.

13. The method of claim 7, further comprising:
receiving a retransmission request that identifies a particular sequence value; and
in response to receiving the retransmission request, sending one or more messages that are selected, based on the particular sequence value, from among one or more messages that were sent to the group.

14. A volatile or non-volatile computer-readable medium carrying one or more sequences of instructions for optimized reliable non-member group communication through write-only membership, which instructions, when executed by one or more processors, cause the one or more processors to perform steps comprising:
receiving a message that was sent to a group from a non-group member process;
in response to receiving the message, determining whether a sequence value that was received in connection with the message matches a current value that is associated with the non-group member process; and
if the sequence value matches the current value, then sending to the non-group member process an acknowledgement that indicates the sequence value; wherein the non-group member process does not receive messages that are sent to the group.

15. A volatile or non-volatile computer-readable medium carrying one or more sequences of instructions for optimized reliable non-member group communication through write-only membership, which instructions, when executed by one or more processors, cause the one or more processors to perform steps comprising:
sending one or more messages to a group;
wherein said sending is by a sender that is not a member of the group; and sending, in connection with each such message, a sequence value that identifies the order of each such message relative to others of the one or more messages;

wherein the sequence value is incremented after receiving, by the sender, an acknowledgment, from the group, that indicates the sequence value;

wherein the one or more messages that are sent to the group are received by a plurality of group member processes; and wherein the sender of the one or more messages does not receive the one or more messages.

16. A data processing node that can reliably communicate messages among group member nodes in a distributed multicast group of which the node is a member and also among non-group member nodes, the node comprising:
means for receiving messages from the non-group member nodes;
means for storing a distinct message sequence number space for each message of each process of each of the group member nodes and non-group member nodes; and
means for sending an acknowledgement message to one of the non-group member nodes in response to receiving a message, wherein the acknowledgement message includes a next sequence number in that message sequence number space associated with the one of the non-group member nodes.

17. An apparatus for optimized reliable non-member group communication through write-only membership, comprising:
a network interface that is coupled to the data network for receiving one or more packet flows therefrom;
a processor;
one or more stored sequences of instructions which, when executed by the processor, cause the processor to carry out:
receiving a message that was sent to a group from a non-group member process;
in response to receiving the message, determining whether a sequence value that was received in connection with the message matches a current value that is associated with the non-group member process; and
if the sequence value matches the current value, then sending to the non-group member process an acknowledgement that indicates the sequence value;
wherein the non-group member process does not receive messages that are sent to the group.

18. The apparatus of claim 17, wherein the one or more stored sequences of instructions further comprise instructions which, when executed by the processor, cause the processor to carry out:
if the sequence value is not the same as the current value, then sending a retransmission request to the non-group member process.

19. The apparatus of claim 17, wherein the one or more stored sequences of instructions further comprise instructions which, when executed by the processor, cause the processor to carry out:
based on sequence values that were received in connection with messages that were received from the non-group member process, sorting the messages that were received from the non-group member process.

20. The apparatus of claim 17, wherein the one or more stored sequences of instructions further comprise instructions which, when executed by the processor, cause the processor to carry out:
if the sequence value is the same as the current value, then incrementing the current value.

21. The apparatus of claim 17, wherein:
the non-group member process executes on a node that is (a) a part of a distributed system and (b) not associated with the group; and
every message that is sent to the group is delivered only to all nodes that are associated with the group.

22. The apparatus of claim 17, wherein the one or more stored sequences of instructions further comprise instructions which, when executed by the processor, cause the processor to carry out:
if the sequence value is not the same as the current value, then sending to the non-group member process a retransmission request (a) that identifies the sequence value, and (b) whose receipt causes the non-group member process to send one or more messages that are selected, based on the sequence value, from among messages that the non-group member process has already sent to the group.

23. An apparatus for optimized reliable non-member group communication through write-only membership, comprising:
a network interface that is coupled to the data network for receiving one or more packet flows therefrom;
a processor;
one or more stored sequences of instructions which, when executed by the processor, cause the processor to carry out:
sending one or more messages to a group;
wherein said sending is by a sender that is not a member of the group; and sending, in connection with each such message, a sequence value that identifies the order of each such message relative to others of the one or more messages;
wherein the sequence value is incremented after receiving, by the sender, an acknowledgment, from the group, that indicates the sequence value;
wherein the one or more messages that are sent to the group are received by a plurality of group member processes; and
wherein the sender of the one or more messages does not receive the one or more messages.

24. The apparatus of claim 23, wherein the one or more stored sequences of instructions further comprise instructions which, when executed by the processor, cause the processor to carry out:
receiving, from at least one of the group member processes, an acknowledgement that indicates a sequence value that was sent in connection with one of the one or more messages.

25. The apparatus of claim 23, wherein the one or more stored sequences of instructions further comprise instructions which, when executed by the processor, cause the processor to carry out:
receiving, from at least one of the group member processes, a retransmission request that indicates a sequence value that was sent in connection with one of the one or more messages.

26. The apparatus of claim 23, wherein the sequence value is used by one or more of the group member processes to sort the one or more messages.

27. The apparatus of claim 23, wherein the sequence value is used by one or more of the group member processes to determine whether any of the one or more messages was not received.

28. The apparatus of claim 23, wherein:
the plurality of group member processes execute on one or more nodes that are (a) a part of a distributed system and (b) associated with the group; and
every message that is sent to the group is delivered only to all nodes that are associated with the group.

29. The apparatus of claim 23, wherein the one or more stored sequences of instructions further comprise instructions which, when executed by the processor, cause the processor to carry out:
receiving a retransmission request that identifies a particular sequence value; and
in response to receiving the retransmission request, sending one or more messages that are selected, based on the particular sequence value, from among one or more messages that were sent to the group.

30. A data processing node that can reliably communicate messages to group member nodes in a distributed multicast group of which the node is not a member, the node comprising:
means for sending one or more messages to a group;
wherein said sending is by a sender that is not a member of the group; and
means for sending, in connection with each such message, a sequence value that identifies the order of each such message relative to others of the one or more messages;
wherein the sequence value is incremented after receiving, by the sender, an acknowledgment, from the group, that indicates the sequence value;
wherein the one or more messages that are sent to the group are received by a plurality of group member processes; and
wherein the sender of the one or more messages does not receive the one or more messages.

* * * * *